(12) United States Patent
Shin

(10) Patent No.: US 9,104,177 B2
(45) Date of Patent: Aug. 11, 2015

(54) APPARATUS AND A METHOD FOR RECONSTRUCTING A HOLOGRAM

(75) Inventor: Sung Chul Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 565 days.

(21) Appl. No.: 13/391,767

(22) PCT Filed: Aug. 24, 2010

(86) PCT No.: PCT/KR2010/005621
§ 371 (c)(1),
(2), (4) Date: Feb. 22, 2012

(87) PCT Pub. No.: WO2011/025210
PCT Pub. Date: Mar. 3, 2011

(65) Prior Publication Data
US 2012/0147134 A1    Jun. 14, 2012

Related U.S. Application Data

(60) Provisional application No. 61/236,529, filed on Aug. 25, 2009.

(51) Int. Cl.
*H04N 13/04* (2006.01)
*G03H 1/22* (2006.01)
*G03H 1/00* (2006.01)
*G03H 1/04* (2006.01)
*G03H 1/26* (2006.01)

(52) U.S. Cl.
CPC ........... *G03H 1/2205* (2013.01); *G03H 1/2294* (2013.01); *G03H 2001/0088* (2013.01); *G03H 2001/0445* (2013.01); *G03H 2001/221* (2013.01); *G03H 2001/2218* (2013.01); *G03H 2001/2239* (2013.01); *G03H 2001/2292* (2013.01); *G03H 2001/2297* (2013.01); *G03H 2001/2655* (2013.01); *G03H 2225/60* (2013.01); *G03H 2226/04* (2013.01)

(58) Field of Classification Search
None
See application file for complete search history.

(56) References Cited

U.S. PATENT DOCUMENTS

| 5,212,571 A | 5/1993 | Garlick et al. ..................... 359/9 |
| 5,515,183 A * | 5/1996 | Hashimoto ....................... 359/9 |
| 5,548,418 A | 8/1996 | Gaynor et al. ................... 359/20 |

(Continued)

FOREIGN PATENT DOCUMENTS

| CN | 1475878 A | 2/2004 |
| CN | 1866137 A | 11/2006 |

(Continued)

OTHER PUBLICATIONS

International Search Report dated Feb. 24, 2011 issued in Application No. PCT/KR2010/005621.

(Continued)

*Primary Examiner* — Sath V Perungavoor
*Assistant Examiner* — Janese Duley
(74) *Attorney, Agent, or Firm* — KED & Associates LLP

(57) ABSTRACT

An apparatus and method for reconstructing a hologram are disclosed. An illuminator emits a reference beam, a hologram display driver displays an interference pattern based on a video signal, a lens unit adjusts a magnification and a focus of a hologram reproduced by projecting the emitted reference beam onto the displayed interference pattern, and a scanning unit scans the adjusted hologram to pixels of a screen by controlling a direction of the adjusted hologram.

14 Claims, 11 Drawing Sheets

(56) References Cited

U.S. PATENT DOCUMENTS

| | | | |
|---|---|---|---|
| 5,798,864 A | 8/1998 | Sekiguchi | 359/559 |
| 6,359,664 B1* | 3/2002 | Faris | 349/15 |
| 6,525,821 B1* | 2/2003 | Thomas et al. | 356/457 |
| 2005/0284996 A1* | 12/2005 | Elgie et al. | 248/274.1 |
| 2008/0259763 A1* | 10/2008 | Bates et al. | 369/103 |
| 2009/0086296 A1 | 4/2009 | Renaud-Goud | 359/9 |
| 2009/0122266 A1 | 5/2009 | Miller | 353/31 |
| 2010/0253677 A1* | 10/2010 | Kroll et al. | 345/419 |
| 2011/0157297 A1* | 6/2011 | O'Connell | 348/14.07 |

FOREIGN PATENT DOCUMENTS

| | | | |
|---|---|---|---|
| CN | 1945605 A | | 4/2007 |
| CN | 101176043 A | | 5/2008 |
| CN | 101371594 A | | 2/2009 |
| CN | 101449214 A | | 6/2009 |
| DE | 10 2007 024 235 A1 | | 11/2008 |
| JP | 05-083702 | * | 4/1993 |
| JP | 07-261125 A | | 10/1995 |
| KR | 10-2007-0038894 A | | 4/2007 |
| KR | 10-2009-0010775 A | | 1/2009 |

OTHER PUBLICATIONS

Yasuhiro, Takaki et al.; "Hologram Generation by Horizontal Scanning of a High Speed Spatial Light Modulator"; Applied Optics, Optical Society of America, Washington, DC; vol. 48, No. 17; Jun. 10, 2009; pp. 3255-3260 (XP-001524464).

European Search Report dated Jan. 28, 2013 issued in Application No. 10 81 2224.

Chinese Office Action issued in Application No. 201080038038.8, dated Sep. 29, 2014 (English translation).

* cited by examiner

APPARATUS AND A METHOD FOR RECONSTRUCTING A HOLOGRAM

TECHNICAL FIELD

The present invention relates to an apparatus and a method for reconstructing a hologram.

BACKGROUND ART

In general, three-dimensional (3D) imaging (or stereoscopic imaging) depends on the principle of stereovision. The stereoscopic effect is primarily based upon binocular parallax, which is the distance, on average about 65 mm in humans, between a pair of eyes. Each of the left and right eyes view a separate planar image and the brain combines the two separate images into a 3D image to thereby give a sense of depth and a sense of reality.

3D display technologies are largely classified into three types: stereoscopic, volumetric and holographic. In a stereoscopic 3D display, for example, depth information is added to a two-dimensional (2D) image so that an observer is tricked into perceiving a 3D image with a sense of depth and a sense of reality. Holography offers the potential to create true 3D images that have all the human visual system depth cues of a natural object.

DISCLOSURE OF INVENTION

Technical Problem

Accordingly, the present invention is directed to an apparatus and a method for reconstructing a hologram that substantially obviates one or more problems due to limitations and disadvantages of the related art.

An object of the present invention is to provide an apparatus and a method for reconstructing a hologram under a low-resolution condition.

Another object of the present invention is to provide a hologram reconstruction apparatus and a method for moving a hologram to an intended position.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Solution to Problem

To achieve these objects and other advantages and in accordance with the purpose of the invention, as embodied and broadly described herein, a hologram reconstruction apparatus includes an illuminator configured to emit a reference beam, a hologram display driver configured to display an interference pattern based on a video signal, a lens unit configured to adjust a magnification and a focus of a hologram reproduced by projecting the emitted reference beam onto the displayed interference pattern, and a scanning unit configured to scan the adjusted hologram to pixels of a screen by controlling a direction of the adjusted hologram.

The hologram display driver may include a Computer Generated Hologram (CGH) processor configured to generate a control signal for displaying the interference pattern based on the video signal, and a light modulator configured to display the interference pattern according to the control signal.

The light modulator may be one of a reflective light modulator and a transmissive light modulator.

The light modulator may modulate light by one of a method for modulating light by changing a refractive index and a method for changing properties of adjacent lights by spacing the adjacent lights from each other.

The lens unit may decrease the magnification of the hologram.

The scanning unit may scan the adjusted hologram by one of interlaced scanning, progressive scanning, and check pattern scanning. The check pattern scanning may be scanning odd-numbered pixels alternately with even-numbered pixels.

The scanning unit may scan the adjusted hologram by one of one-dimensional horizontal scanning, one-dimensional vertical scanning, and two-dimensional scanning.

The scanning unit may include a plurality of scanners arranged in at least one of a parallel layout, a serial layout, and a hybrid serial-and-parallel layout.

The hologram display driver and the scanning unit may be in at least one of a one-to-one relationship, a one-to-multi relationship, and a multi-to-one relationship.

The scanning unit may scan the adjusted hologram to a partial area of the screen. The hologram scanned to the partial area of the screen may be a logo.

The partial area of the screen may be determined based on one of preset position information and received position information.

The position of the partial area of the screen may be changed according to an input control command.

In another aspect of the present invention, a method for reconstructing a hologram includes emitting a reference beam, displaying an interference pattern based on a video signal, adjusting a magnification and a focus of a hologram reproduced by projecting the emitted reference beam onto the displayed interference pattern, and scanning the adjusted hologram to pixels of a screen by controlling a direction of the adjusted hologram.

The magnification of the hologram may be decreased.

The adjusted hologram may be scanned by one of interlaced scanning, progressive scanning, and check pattern scanning.

The adjusted hologram may be scanned to a partial area of the screen.

The method may further include receiving the video signal, and extracting three-dimensional object information from the received video signal, and the interference pattern may be displayed based on the extracted three-dimensional object information.

The hologram may be displayed on the screen, while a two-dimensional video signal included in the received video signal is being displayed on the screen.

It is to be understood that both the foregoing general description and the following detailed description of the present invention are exemplary and explanatory and are intended to provide further explanation of the invention as claimed.

Advantageous Effects of Invention

As is apparent from the above description of the apparatus and method for reconstructing a hologram according to the present invention, since a partial hologram pattern can be formed at a target position by controlling the magnification and focus of the partial hologram pattern, a hologram can be reconstructed under a low-resolution condition and displayed at a desired position or a user-set position within an image.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

In addition, although the terms used in the present invention are selected from generally known and used terms, some of the terms mentioned in the description of the present invention have been selected by the applicant at his or her discretion, the detailed meanings of which are described in relevant parts of the description herein. Furthermore, the present invention must be understood, not simply by the actual terms used but by the meanings of each term lying within.

Figure 1:
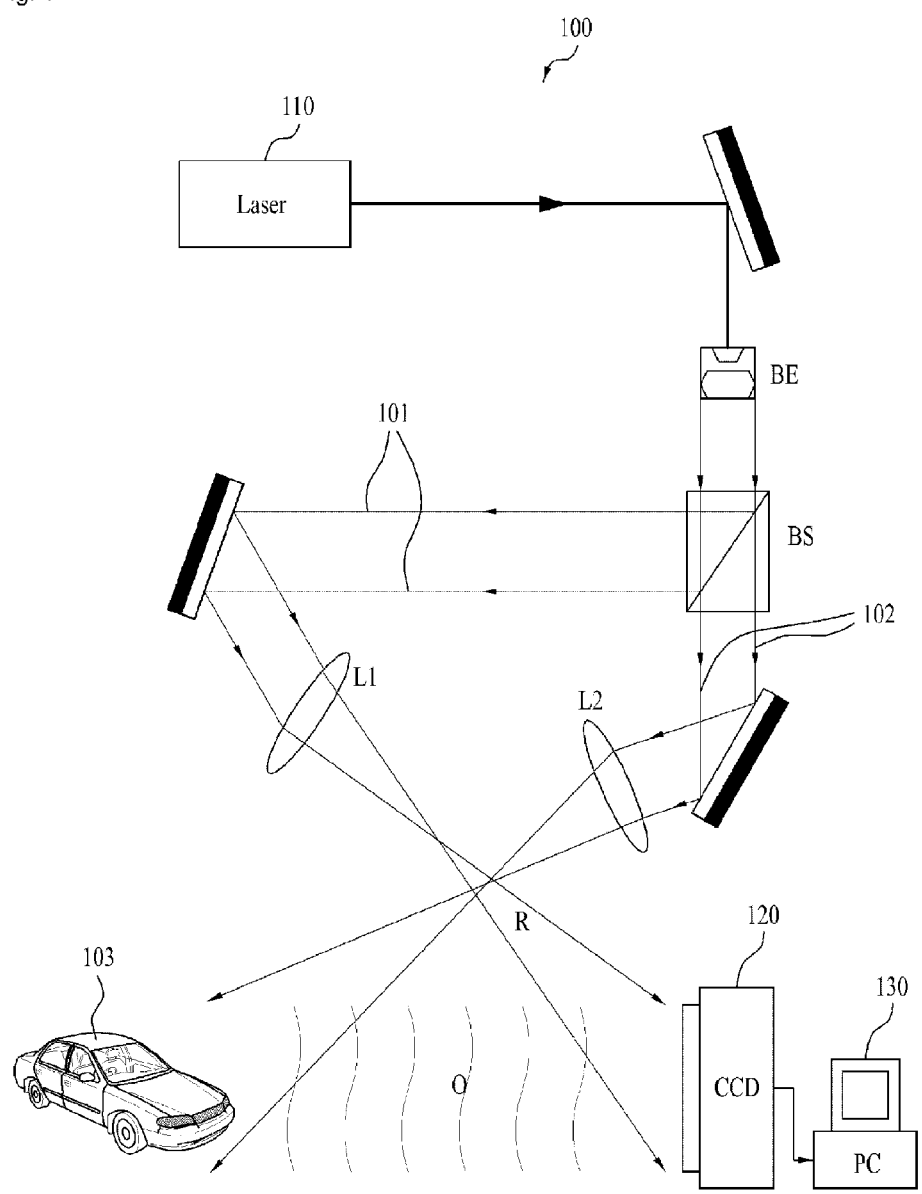
FIG. 1 illustrates the configuration of a hologram recording system.
Figure 2:
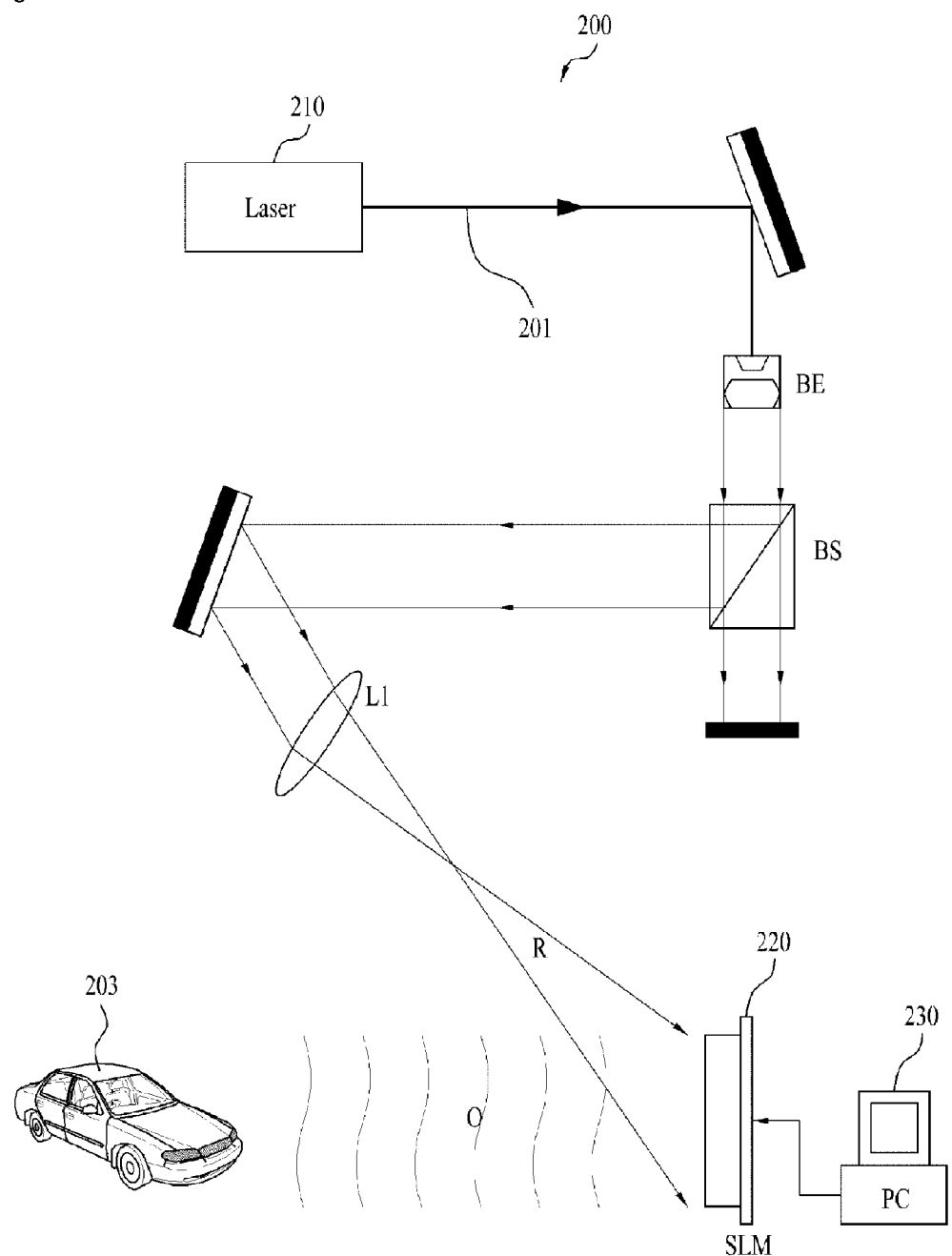
FIG. 2 illustrates the configuration of a hologram reconstruction system.

FIG. 1 illustrates the configuration of a hologram recording system and FIG. 2 illustrates the configuration of a hologram reconstruction system.

Referring to FIGS. 1 and 2, a hologram recording system 100 converts a laser beam emitted from a laser 110 into parallel light using a condenser lens, passes the parallel light through a Beam Expander (BE), and splits the parallel light output from the BE into a reference wave 101 and an object wave 102 by a Beam Splitter (BS). The object wave 102 illuminates an object 103 through a lens L2 and then is projected directly onto a Charge Coupled Device (CCD), together with the reference wave 101 that has passed through a lens L1, thus creating an interference pattern, namely a digital hologram. The digital hologram may be stored as interference pattern information in a PC 130.

A hologram reconstruction system 200 applies interference pattern information stored in a PC 230 to a Spatial Light Modulator (SLM). Then the hologram reconstruction system 200 projects parallel light 201 emitted from a laser 210 onto the SLM 220, thus generating first-order diffracted light. As a consequence, a 3D object 203 can be reproduced. A hologram may be acquired using the hologram recording system 100 illustrated in FIG. 1 or by mathematical modeling of the hologram recording system. The hologram obtained through the mathematical modeling is called a Computer Generated Hologram (CGH).

Figure 3:
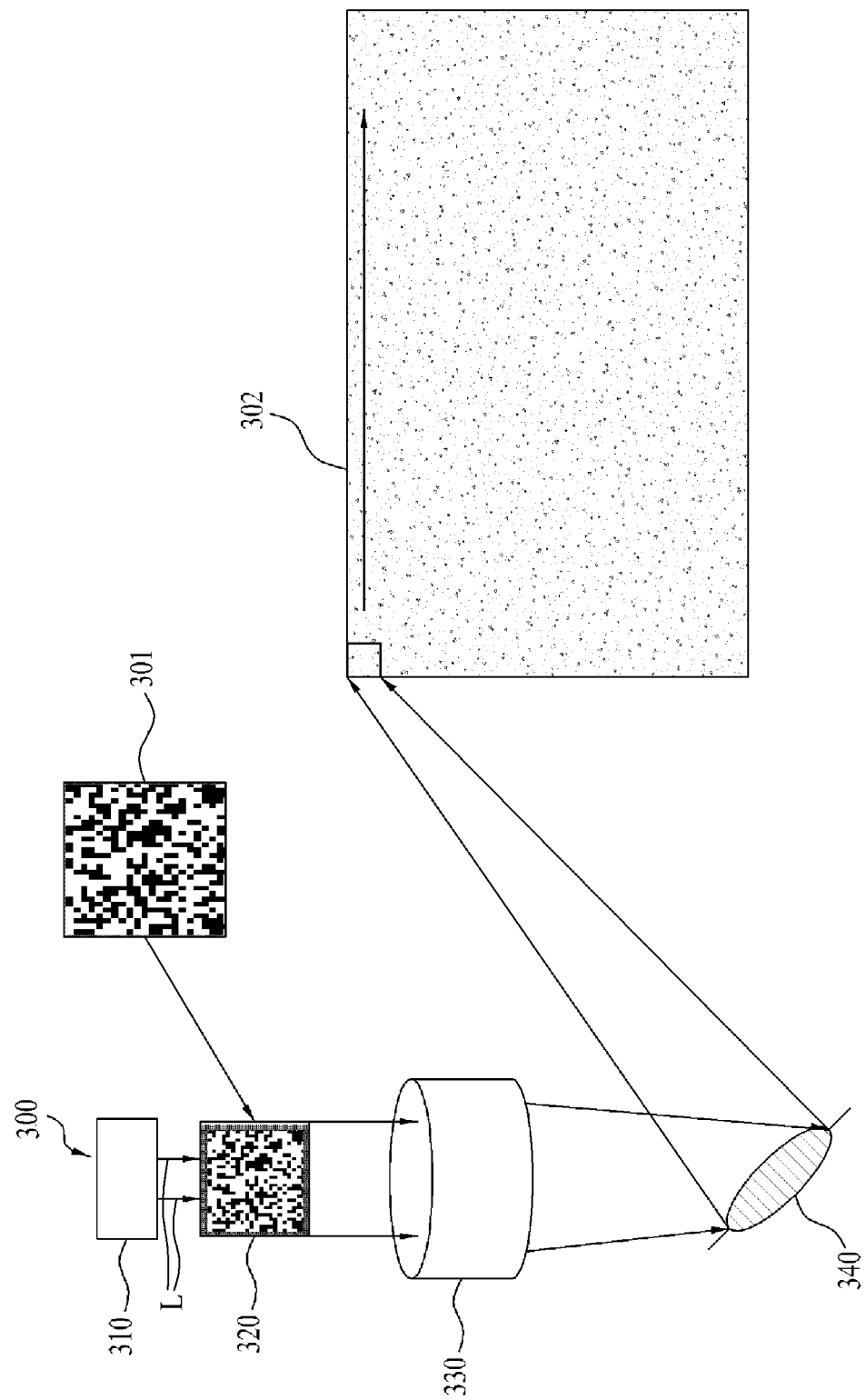
FIG. 3 illustrates the configuration of a hologram reconstruction apparatus according to an exemplary embodiment of the present invention.

FIG. 3 illustrates the configuration of a hologram reconstruction apparatus according to an exemplary embodiment of the present invention.

Referring to FIG. 3, a hologram reconstruction apparatus 300 according to the present invention may include an illuminator 310, a hologram display driver 320, a lens unit 330, and a scanning unit 340.

The illuminator 310 may output a reference beam L, uniformly with directionality. The illuminator 310 may include a plurality of light source units and each light source unit may emit an interfering beam.

The hologram display driver 320 may display an interference pattern based on a 3D video signal. When the reference beam L is projected onto the interference pattern displayed by the hologram display driver 320, a hologram may be reproduced. The 3D video signal may be received from a broadcasting station or stored in a storage medium.

The lens unit 330 adjusts the magnification and focus of the reproduced hologram. Specifically, the lens unit 300 may increase or decrease the magnification of the reproduced hologram and focus the magnification-increased or decreased hologram so that the hologram is clear. The lens unit 330 may include a plurality of lenses. Depending on the configuration of the lenses, the lens unit 330 may contract or enlarge the hologram. The lenses may be Diffractive Optical Elements (DOEs) including conventional lenses, or digital segment lenses.

The scanning unit 340 may move the magnification-adjusted and focused hologram to a target position by controlling the direction of the hologram. For example, the scanning unit 340 may form the hologram on a screen by moving the hologram to the screen. The scanning unit 340 may include a plurality of scanners and each scanner may scan the hologram that has passed through the lens unit 330 to pixels of the screen. The screen may be a projection screen. The projection screen is a device that projects an image magnified tens of, hundreds of, or thousands of times on a screen based on a signal received from a projector, a computer, or image equipment such as a VTR and a camcorder.

The scanning unit 340 places the reproduced hologram at a target position through interlaced scanning, progressive scanning or checked pattern scanning of the reproduced hologram. In addition, the scanning unit 340 may perform one-dimensional horizontal and vertical scanning. The scanning may be carried out in any direction, for example, left to right, right to left, downward, or upward. The scanning unit 340 may also perform two-dimensional scanning.

Due to the large amount of data needed to display a holographic image, a high-resolution modulator may be required to drive the data. For example, 110,000,000 pixels may be required to represent a hologram on an area of 20 mm×20 mm at a viewing angle of 30°. An existing high-resolution SLM usually has a resolution of 1920×1080 pixels (about 2 million pixels) and a pixel pitch of 8 μm. Therefore, 55 times more pixels may be required. However, the hologram reconstruction apparatus 300 of the present invention may overcome the resolution limitation of holography because it passes an intended partial holographic pattern of an entire image through the lens unit 330 such that the partial holographic pattern is contracted or enlarged in focus on an image forming plane and then moves the passed holographic pattern to a target position by use of the scanning unit 340.

Figure 4:
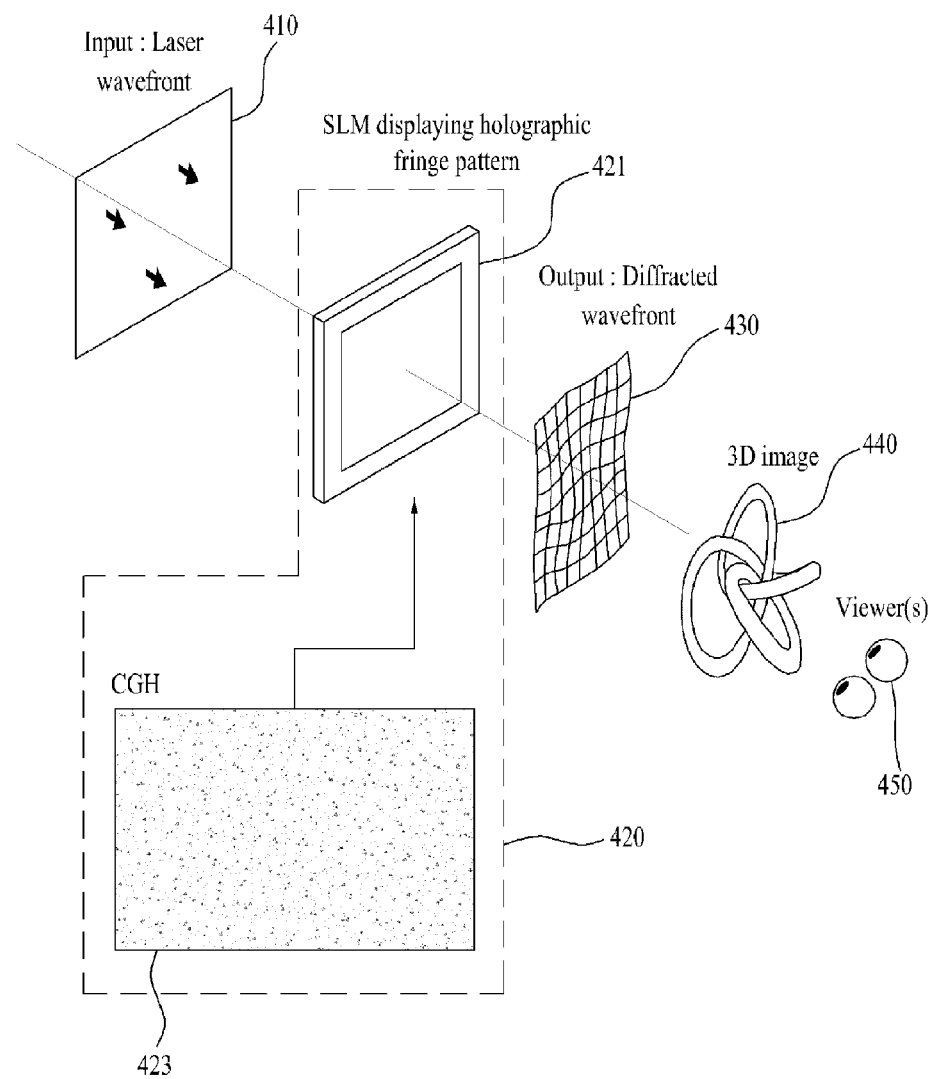
FIG. 4 illustrates a hologram display driver.

FIG. 4 illustrates the hologram display driver.

Referring to FIG. 4, a hologram display driver 420 may include a light modulator 421 and a CGH processor 423. The hologram display driver 420 may have a plurality of light modulators.

The light modulator 421 may be reflective or transmissive. The SLM 220 illustrated in FIG. 2 is a reflective light modulator and the light modulator 421 is a transmissive light modulator.

The light modulator 421 may modulate light using a scheme for changing the refractive index of light or a scheme for changing the properties of adjacent lights by spacing the adjacent lights from each other. When light emitted from a laser 410 is incident on the light modulator 421 that is displaying an interference pattern 430 according to a control signal received from the CGH processor 423, a hologram 440 is reproduced. Thus a viewer can see the reproduced hologram 440.

The CGH processor 423 may generate the control signal to be applied to the light modulator 421, using 3D object information. The 3D object information may be obtained by encoding a CGH of a 3D object. The 3D object information may be received from a broadcasting station. The broadcasting station may transmit a video signal including the 3D object information and 2D image information.

Figure 5:
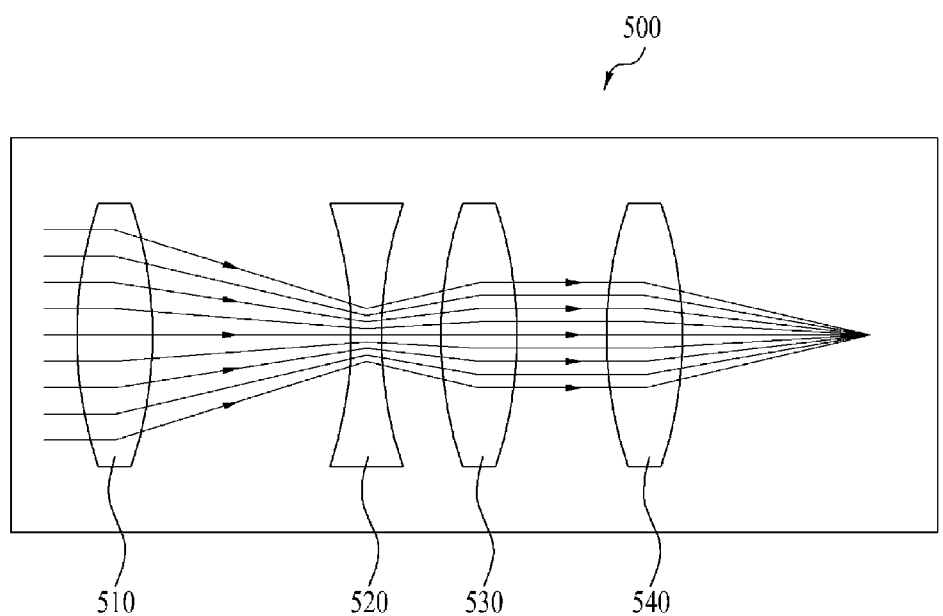
FIG. 5 illustrates the configuration of a lens unit according to an exemplary embodiment of the present invention.

FIG. 5 illustrates the configuration of the lens unit according to an exemplary embodiment of the present invention.

Referring to FIG. 5, a lens unit 500 may include lenses 510 to 540. The lenses 510, 520 and 530 may decrease the magnification of light incident on the lens unit 500 and control the focus of the incident light. The lens 510 condenses the incident light by refracting the incident light, the lens 520 disperses the light passed through the lens 510 by refracting the passed light, and the lens 540 lets the light passed through the lens 520 impinge on the lens 540 in parallel. The lens 540 adjusts the focus of the incident light and applies the focused light to the scanning unit 340.

Figure 6:
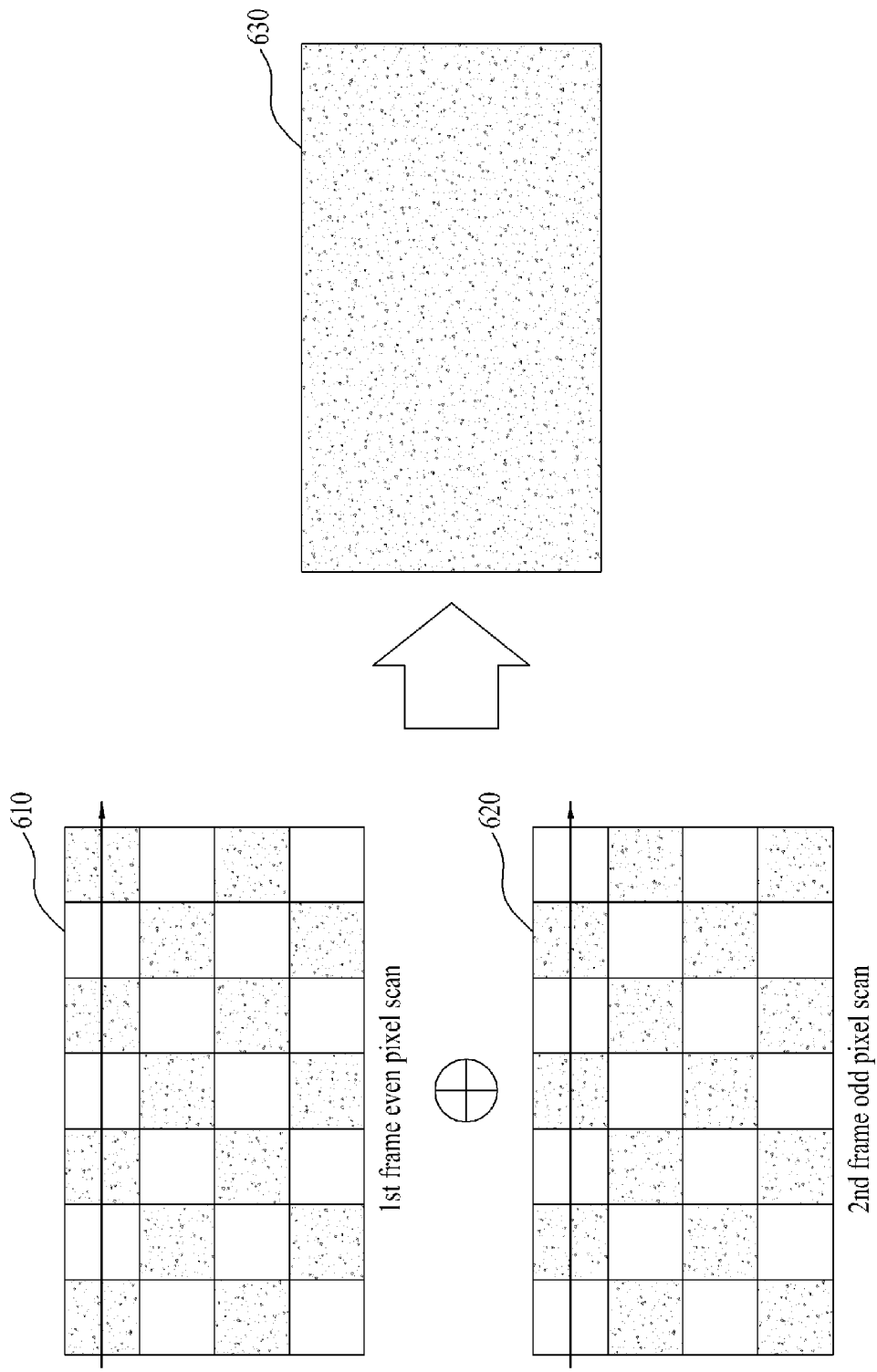
FIG. 6 illustrates the principle of check pattern scanning.

FIG. 6 illustrates the principle of check pattern scanning.

Referring to FIG. 6, check pattern scanning refers to scanning even-numbered pixels alternately with odd-numbered pixels. Specifically, a frame 610 including the pixel values of even-numbered pixels is scanned on a screen 630 and then a frame 620 including the pixel values of odd-numbered pixels is scanned on the screen 630. In this manner, a hologram is formed on the screen 630 by the check pattern scanning.

Figure 7:
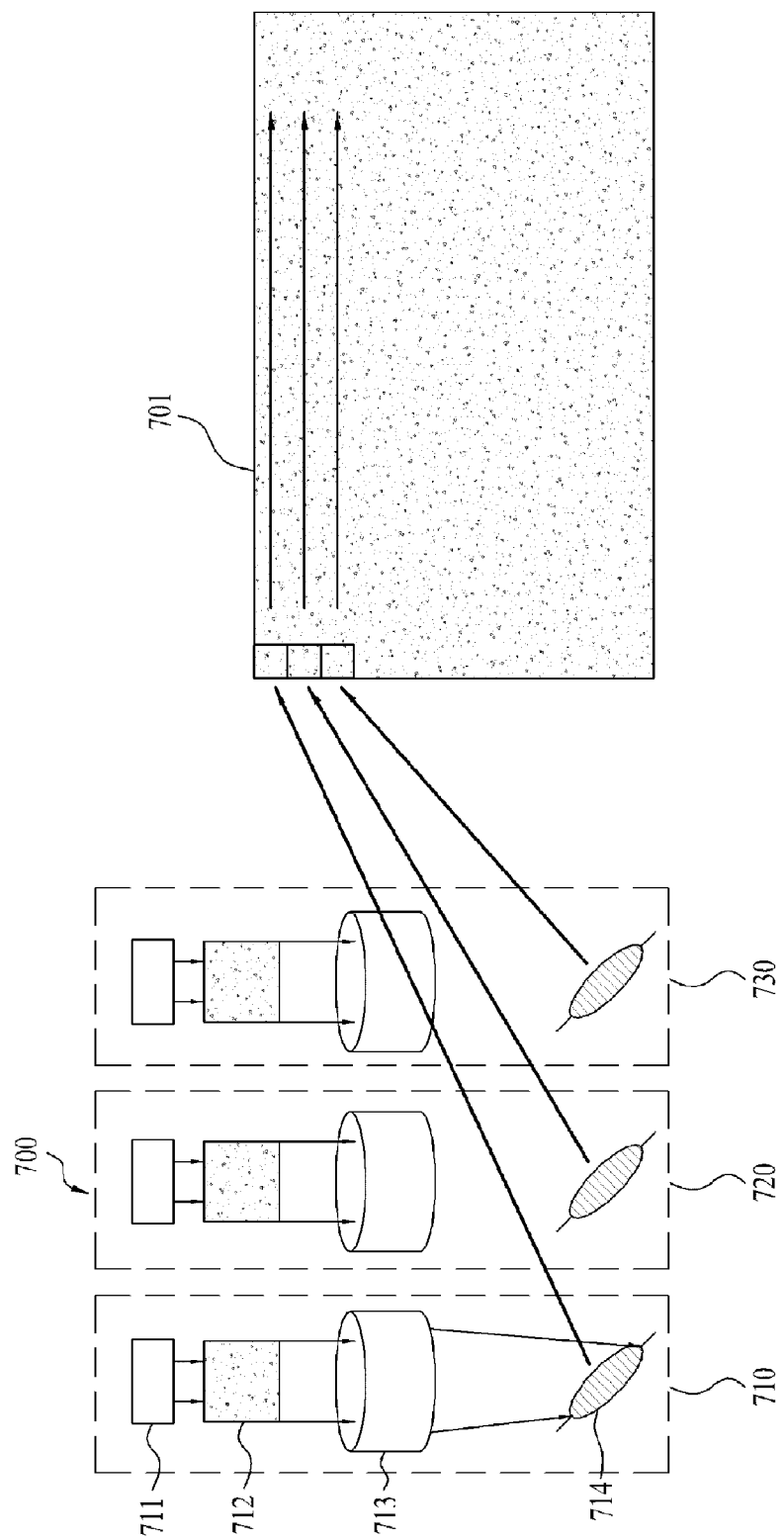
FIG. 7 illustrates the configuration of a hologram reconstruction apparatus according to another exemplary embodiment of the present invention.

FIG. 7 illustrates the configuration of a hologram reconstruction apparatus according to another exemplary embodiment of the present invention.

Referring to FIG. 7, an illuminator 711, a hologram display driver 712, a lens unit 713, and a scanning unit 714 may collectively form a single set 710. Like the set 710, each of sets 720 and 730 may be configured so as to include an illuminator, a hologram display driver, a lens unit, and a scanning unit. That is, a hologram reconstruction apparatus 700 may include the sets 710, 720 and 730.

The sets 710, 720 and 730 each may reproduce a part of a hologram independently and scan the reproduced partial hologram on a screen 701. As illustrated in FIG. 7, the sets 710, 720 and 730 may be arranged in parallel so that they scan in parallel. Alternatively or additionally, the sets 710, 720 and 730 may be arranged in a serial layout or in a hybrid serial-and-parallel layout.

Figure 8:
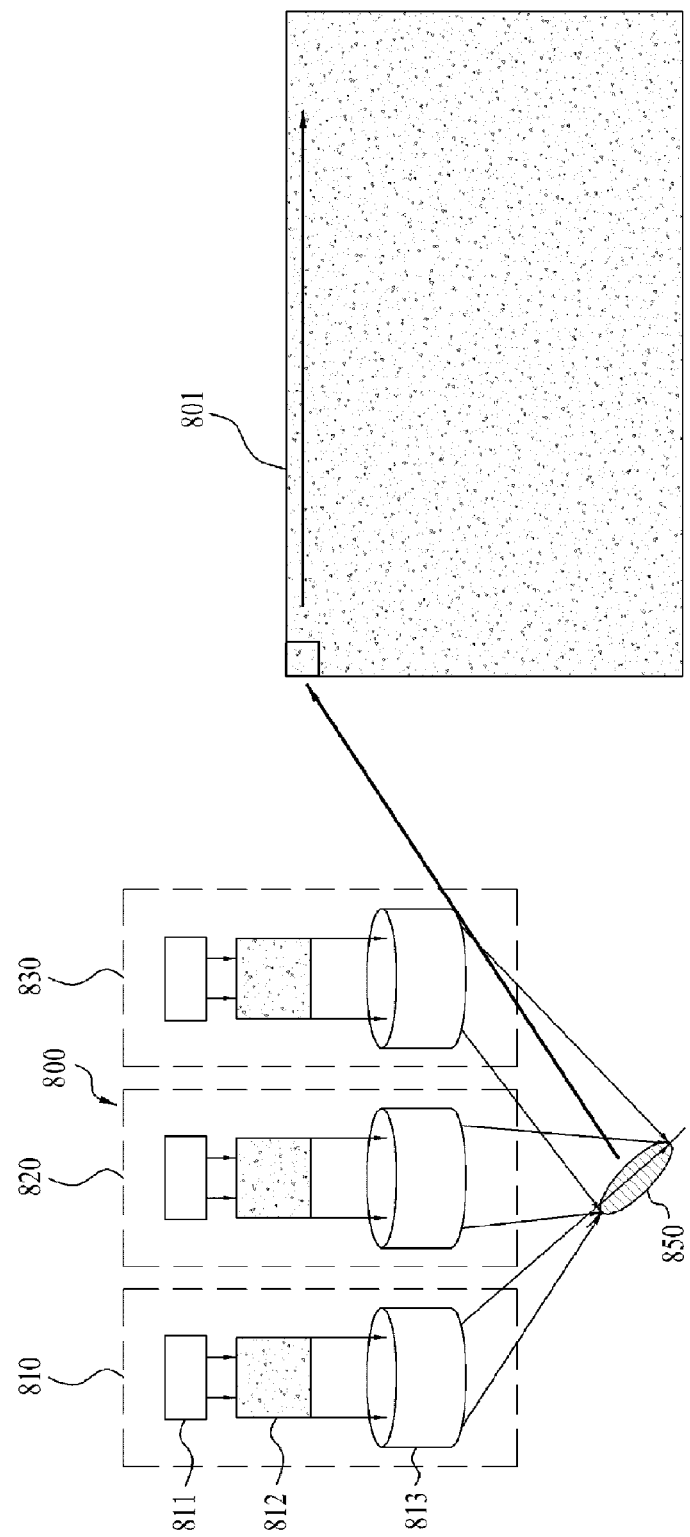
FIG. 8 illustrates the configuration of a hologram reconstruction apparatus according to another exemplary embodiment of the present invention.

FIG. 8 illustrates the configuration of a hologram reconstruction apparatus according to another exemplary embodiment of the present invention.

Referring to FIG. 8, an illuminator 811, a hologram display driver 812, and a lens unit 813 may collectively form a single set 810. Like the set 810, each of sets 820 and 830 may be configured so as to include an illuminator, a hologram display driver and a lens unit. The sets 810, 820 and 830 may each apply a reproduced hologram to a scanning unit 850. That is, a hologram reconstruction apparatus 800 may include a plurality of sets and one scanning unit.

The scanning unit 850 may scan the holograms reproduced by the sets 810, 820 and 830 on a screen 801 by controlling the directions of the holograms.

Figure 9:
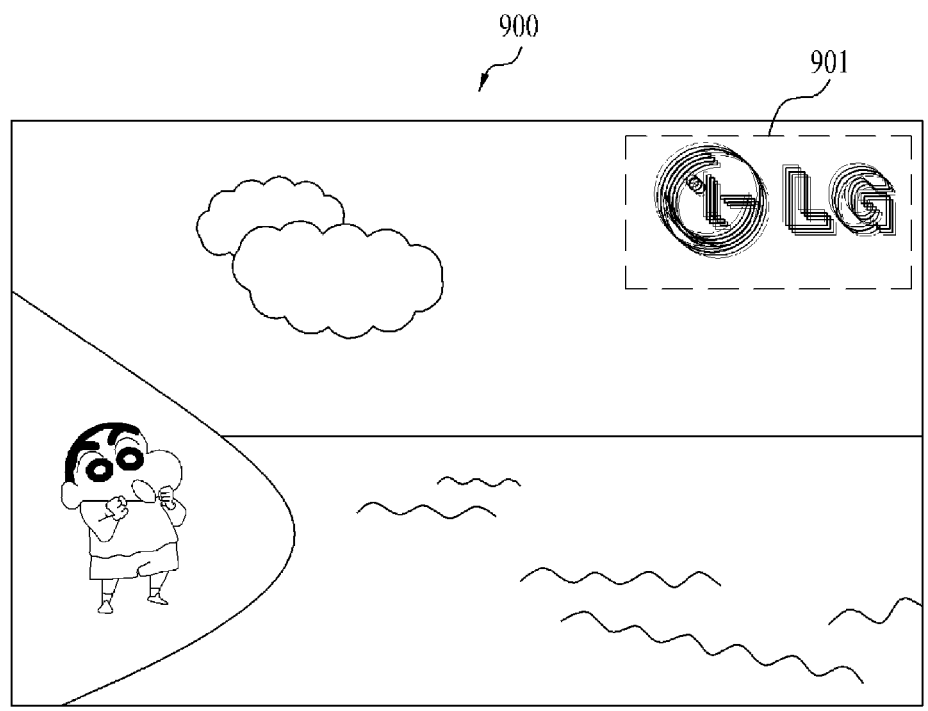
FIG. 9 illustrates a screen on which a hologram is displayed.

FIG. 9 illustrates a screen on which a hologram is displayed.

Referring to FIG. 9, the scanning unit 340 may scan a reproduced hologram to pixels of a partial area 901 of a screen 900. The hologram 901 may be a holographic pattern occupying a part of a full image displayed on the screen 900.

The holographic pattern 901 may be a logo. That is, the holographic pattern 901 may be at least one of the logo of a current display device, an advertised product logo, a company logo, a channel logo, and an advertisement logo.

The partial area 901 may be determined based on preset position information or position information included in a broadcast signal. The preset position information may be adjusted by a user-input command. While the hologram is being displayed in the partial area 901, the partial area 901 may be moved automatically or according to an input control command.

Holographic patterns may be displayed in a plurality of partial areas. The holographic patterns may be identical or different.

Figure 10:
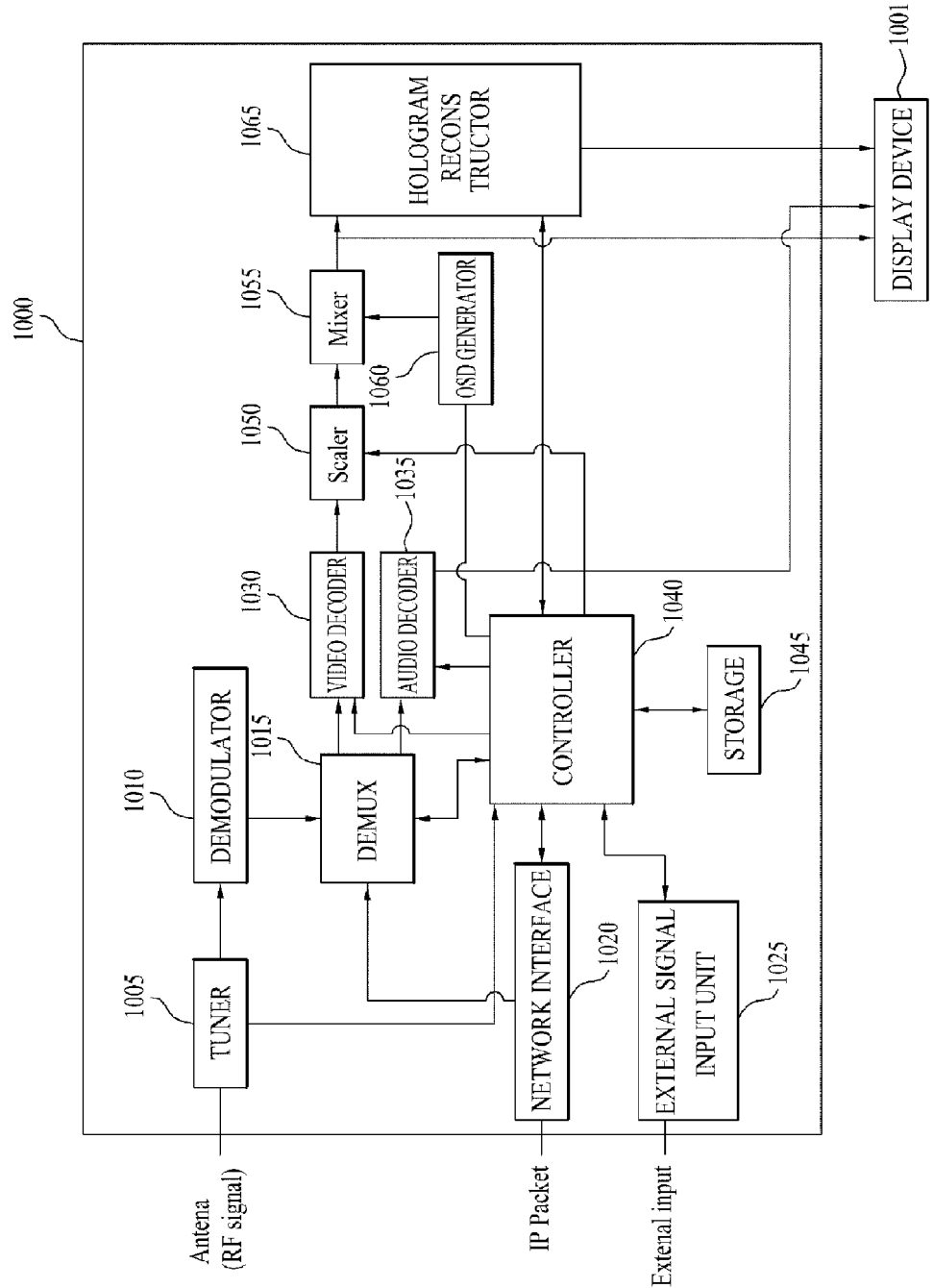
FIG. 10 is a block diagram of a hologram reconstruction apparatus according to a further exemplary embodiment of the present invention.

FIG. 10 is a block diagram of a hologram reconstruction apparatus according to a further exemplary embodiment of the present invention.

Referring to FIG. 10, a hologram reconstruction apparatus 1000 of the present invention may include a tuner 1005, a demodulator 1010, a demultiplexer (DEMUX) 1015, a network interface 1020, an external signal input unit 1025, a video decoder 1030, an audio decoder 1035, a controller 1040, a storage 1045, a scaler 1050, a mixer 1055, an On Screen Display (OSD) generator 1060, and a hologram reconstructor 1065. The hologram reconstruction apparatus 1000 may be a PC such as a desktop computer, a laptop, or a tablet PC. Also, the hologram reconstruction apparatus 1000 may be a broadcasting receiver capable of receiving terrestrial broadcasting, satellite broadcasting, cable broadcasting, and/or Internet broadcasting.

Further, the hologram reconstruction apparatus 1000 may be a broadcasting receiver that can provide Internet service to a viewer. The Internet service refers to services available over the Internet, including a Content on Demand (CoD) service, a YouTube service, an information service such as weather information, news, local information, and search services, an entertainment service like games and karaoke, and a communication service such as TV mail and TV Short Message Service (SMS). Therefore, the broadcasting receiver may be any of a network TV, a Web TV, and a broadband TV in the present invention. The hologram reconstruction apparatus 1000 may also be a smart TV that can receive an application from a server over a network and install and execute the application.

Broadcasting services received at the hologram reconstruction apparatus 1000 may include Internet service as well as terrestrial, satellite and cable broadcasting services. The broadcasting services may provide 3D images as well as 2D images. The 3D images may be holograms.

The tuner 1005 selects a Radio Frequency (RF) broadcast signal corresponding to a user-selected channel from among RF broadcast signals received through an antenna and down-converts the RF broadcast signal to a digital Intermediate Frequency (IF) signal DIF or an analog baseband Audio/Video (A/V) signal. The tuner 1005 may be able to receive RF broadcast signals from an Advanced Television Systems Committee (ATSC) single-carrier system or from a Digital Video Broadcasting (DVB) multi-carrier system.

The demodulator 1010 receives the digital IF signal DIF from the tuner 1005 and demodulates the digital IF signal DIF. For example, if the digital IF signal DIF is an ATSC signal, the demodulator 1010 performs 8-Vestigial SideBand (8-VSB) demodulation on the digital IF signal DIF. In another example, if the digital IF signal DIF is a DVB signal, the demodulator 1010 performs Coded Orthogonal Frequency Division Multiple Access (COFDMA) demodulation on the digital IF signal DIF.

The demodulator 1010 may also perform channel decoding. For the channel decoding, the demodulator 1010 may include a Trellis decoder, a deinterleaver and a Reed-Solomon decoder, thus performing Trellis decoding, deinterleaving and Reed-Solomon decoding.

The demodulator 1010 may perform demodulation and channel decoding on the digital IF signal DIF received from the tuner 110, thereby obtaining a stream signal TS. The stream signal TS may be a signal in which a video signal, an audio signal and a data signal are multiplexed. For example, the stream signal TS may be a Moving Picture Experts Group-2 (MPEG-2) Transport Stream (TS) signal obtained by multiplexing an MPEG-2 video signal and a Dolby AC-3 audio signal. The MPEG-2 TS signal may include a 4-byte header and a 184-byte payload.

The DEMUX 1015 may receive a stream signal from the demodulator 1010, the network interface 1020, and the external signal input unit 1025, demultiplex the input stream signal into a video signal, an audio signal and a data signal, and output the video signal, the audio signal and the data signal respectively to the video decoder 1030, the audio decoder 1035, and the controller 1040.

The video decoder 1030 recovers the video signal received from the DEMUX 1015 and outputs the recovered video signal to the scaler 1050. The video signal may include a 3D video signal, which may be 3D object information.

The audio decoder 1035 recovers the audio signal received from the DEMUX 1015 and outputs the recovered audio signal to the display device 1001.

The network interface 1020 transmits packets to and receives packets from a network. That is, the network interface 1020 receives Internet Protocol (IP) packets carrying broadcast data from a service provider server over the network. The broadcast data may include content, an update message indicating whether content has been updated, metadata, service information, and a software code. The service information may include service information about a real-time broadcasting service and service information about an Internet service.

If an IP packet includes a stream signal, the network interface 1020 may extract the stream signal from the IP packet and output the stream signal to the DEMUX 1015.

The external signal input unit 1025 may interface between an external device and the hologram reconstruction apparatus 1000. The external device may be any of various types of audio or/and video output devices such as a Digital Versatile Disc (DVD) player, a Blu-ray player, a game console, a camcorder, and a computer (e.g. a laptop). The hologram reconstruction apparatus 1000 may control audio and video signals received from the external device input unit 1025 so that they are output audibly and visually, and may store or use a data signal received from the external device input unit 1025.

The controller 1040 executes a command and performs operations associated with the hologram reconstruction apparatus 1000. For example, the controller 1040 may control input, output, data reception, and data processing between components of the hologram reconstruction apparatus 1000 using a command detected from the storage 1045. The controller 1040 may be implemented on a single chip, a plurality of chips, or a plurality of electrical parts. For example, a variety of architectures, such as a dedicated or embedded processor, a single-purpose processor, a controller, or an Application Specific Integrated Circuit (ASIC), may be used to implement the controller 1040.

The controller 1040 executes computer code along with an operating system, and generates and uses data. The operating system is known in the art and thus will not be described in detail herein. For example, the operating system may be one version of the Windows family, Unix, Linux, PalmOS, DOS, Android, MacOS, or the like. The operating system, other computer code, and data may reside in the storage 1045 that operates in connection with the controller 1040.

The storage 1045 usually provides space for storing program code and data used for the hologram reconstruction apparatus 1000. For example, the storage 1045 may be implemented in the form of a Random Access Memory (RAM), a Read-Only Memory (ROM), or a hard disk drive. The program code and data may reside on a separate-type recording medium and thus, when needed, may be loaded or installed on the hologram reconstruction apparatus 1000. Separate-type recording media include a CD-ROM, a PC-CARD, a memory card, a floppy disc, a magnetic tape, and a network component.

The scaler 1050 may scale the video signal processed by the video decoder 1030 so that the processed video signal is output at an appropriate size. Under the control of the controller 1040, the scaler 1050 may scale the video signal to different sizes. The video signal may be zoomed according to the resolution of an light modulator of the hologram reconstructor 1065.

If there is no need to adjust the size of a video signal, a decoded video signal from the video decoder 1030 may be input directly to the mixer 1055, bypassing the scaler 1050.

The OSD generator 1060 generates an OSD signal. The OSD signal may be a holographic pattern.

The mixer 1055 may mix the video signal received from the scaler 1050 or the video decoder 1030 with the OSD signal received from the OSD generator 1060. If the video signal is a 3D video signal, the mixer 1055 may output the 3D video signal to the hologram reconstructor 1065. If a 3D video signal is combined with a 2D video signal in the video signal, the mixer 1055 may extract the 3D video signal from the video signal and output the extracted 3D video signal to the hologram reconstructor 1065. The extracted 3D video signal may be used to reproduce a holographic pattern that will occupy a part of a video frame.

The hologram reconstructor 1065 may reproduce a hologram based on the 3D video signal received from the mixer 1055 and move the reproduced hologram so that the hologram is displayed on the display device 1001. If the reproduced hologram is a partial hologram, the controller 1040 may control synchronized display of the partial hologram and a 2D video frame by outputting a synchronization signal to the scaler 1050 and the hologram reconstructor 1065. On the other hand, if an entire hologram is input separately as partial holograms, the controller 1040 may order the partial holograms based on additional information included in a data stream. The additional information may include at least one of Program and System Information Protocol (PSIP) information, Program Specific Information (PSI), and System Information (SI). Also, the additional information may include ordering information for use in ordering the holograms. The hologram reconstructor 1065 may be one of the hologram reconstruction apparatus 300 illustrated in FIG. 3, the hologram reconstruction apparatus 700 illustrated in FIG. 7, and the hologram reconstruction apparatus 800 illustrated in FIG. 8.

The display device 1001 may be incorporated into the hologram reconstruction apparatus 1000 or configured separately. For example, the display device 1001 may be a projection screen.

Figure 11:
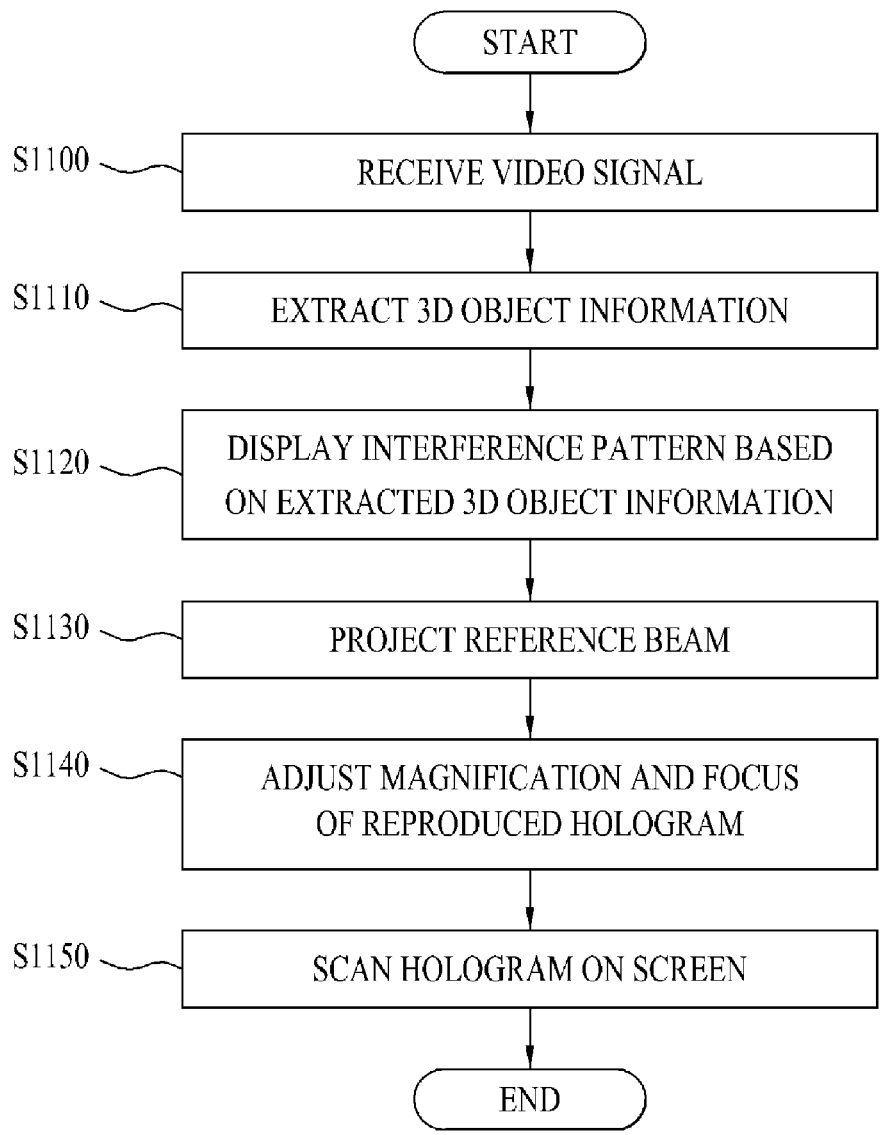
FIG. 11 is a flowchart illustrating a hologram reconstruction method according to an exemplary embodiment of the present invention.

FIG. 11 is a flowchart illustrating a hologram reconstruction method according to an exemplary embodiment of the present invention.

Referring to FIG. 11, the hologram reconstruction apparatus 1000 receives a video signal in step S1100. The video signal may be received through the tuner 1005, the network interface 1020, or the external signal input unit 1025.

The hologram reconstruction apparatus 1000 extracts 3D object information from the received video signal in step S1110. The video signal may include a 2D video signal synchronized with the 3D object information. The 3D object information may be a full image or a holographic pattern occupying a part of a video frame.

The hologram reconstruction apparatus 1000 displays an interference pattern based on the extracted 3D object information in step S1120.

The hologram reconstruction apparatus 1000 reproduces a hologram by projecting a reference beam onto the interference pattern in step S1130.

In step S1140, the hologram reconstruction apparatus 1000 adjusts the magnification and focus of the reproduced hologram.

The hologram reconstruction apparatus 1000 scans the magnification-adjusted and focused hologram to pixels of a screen in step S1150.

As is apparent from the above description of the apparatus and method for reconstructing a hologram according to the present invention, since a partial hologram pattern can be formed at a target position by controlling the magnification and focus of the partial hologram pattern, a hologram can be reconstructed under a low-resolution condition and displayed at a desired position or a user-set position within an image.

Industrial Applicability

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A hologram reconstruction apparatus comprising:
an illuminator configured to emit a reference beam;
a hologram display driver configured to display an interference pattern based on a video signal;
a lens unit configured to adjust a magnification and a focus of a hologram reproduced by projecting the emitted reference beam onto the displayed interference pattern to display on a partial area of a screen; and
a scanning unit configured to scan the adjusted hologram to pixels of the partial area of the screen by controlling a direction of the adjusted hologram,
wherein the lens unit decreases the magnification of the hologram,
wherein the hologram scanned to the pixels of the partial area of the screen is a logo,
wherein the hologram display driver and the scanning unit are in at least one of a multi-to-one relationship and a multi-to-multi relationship, and
wherein multiple hologram display drivers are arranged in a parallel layout.

2. The hologram reconstruction apparatus according to claim 1, wherein the hologram display driver includes:
a Computer Generated Hologram (CGH) processor configured to generate a control signal for displaying the interference pattern based on the video signal; and
a light modulator configured to display the interference pattern according to the control signal.

3. The hologram reconstruction apparatus according to claim 2, wherein the light modulator is one of a reflective light modulator and a transmissive light modulator.

4. The hologram reconstruction apparatus according to claim 2, wherein the light modulator modulates light by one of a method for modulating light by changing a refractive index and a method for changing properties of adjacent lights by spacing the adjacent lights from each other.

5. The hologram reconstruction apparatus according to claim 1, wherein the scanning unit scans the adjusted hologram by one of interlaced scanning, progressive scanning, and check pattern scanning.

6. The hologram reconstruction apparatus according to claim 5, wherein the check pattern scanning is scanning odd-numbered pixels alternately with even-numbered pixels.

7. The hologram reconstruction apparatus according to claim 1, wherein the scanning unit scans the adjusted hologram by one of one-dimensional horizontal scanning, one-dimensional vertical scanning, and two-dimensional scanning.

8. The hologram reconstruction apparatus according to claim 1, wherein the scanning unit includes a plurality of scanners arranged in at least one of a parallel layout, a serial layout, and a hybrid serial-and-parallel layout.

9. The hologram reconstruction apparatus according to claim 1, wherein the partial area of the screen is determined based on one of preset position information and received position information.

10. The hologram reconstruction apparatus according to claim 1, wherein a position of the partial area of the screen is changed according to an input control command.

11. A method for reconstructing a hologram, comprising:
emitting a reference beam;
displaying an interference pattern based on a video signal in a hologram display driver;
decreasing a magnification of a hologram reproduced by projecting the emitted reference beam onto the displayed interference pattern to display on a partial area of a screen;
adjusting a focus of the decreased hologram; and
scanning the adjusted hologram to pixels of the partial area of the screen by controlling a direction of the adjusted hologram in a scanning unit,
wherein the hologram scanned to the pixels of the partial area of the screen is a logo,
wherein the hologram display driver and the scanning unit are in at least one of a multi-to-one relationship and a multi-to-multi relationship, and wherein multiple hologram display drivers are arranged in a parallel layout.

12. The method according to claim 11, wherein the scanning comprises scanning the adjusted hologram using one of interlaced scanning, progressive scanning, and check pattern scanning.

13. The method according to claim 11, further comprising:
receiving the video signal; and
extracting three-dimensional object information from the received video signal, wherein the displaying comprises displaying the interference pattern based on the extracted three-dimensional object information.

14. The method according to claim 13, wherein the hologram is displayed on the screen, while a two-dimensional video signal included in the received video signal is being displayed on the screen.

* * * * *